(No Model.)
H. P. NORTON.
DRAWING PEN.
No. 509,137. Patented Nov. 21, 1893.
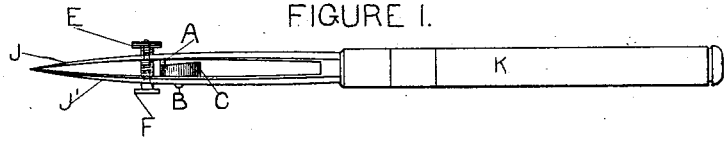
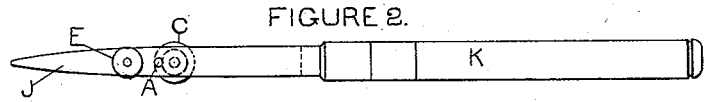
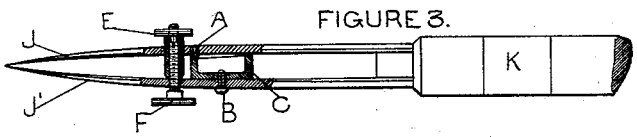
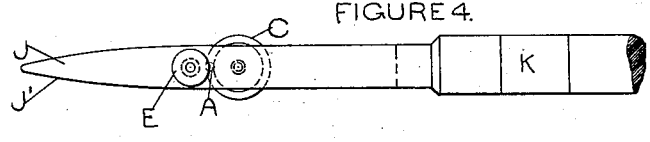
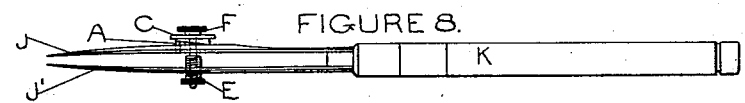
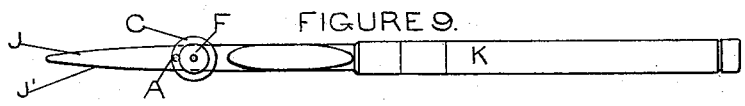
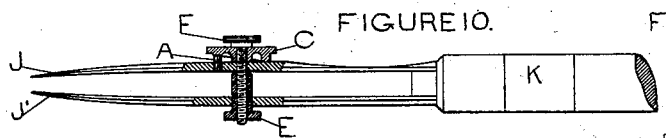
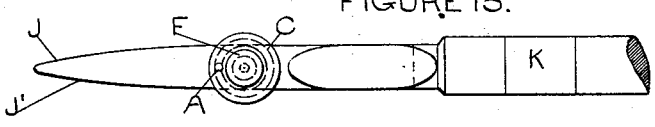
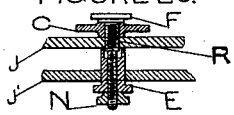
Witnesses
C. A. Carr
W. M. McFarland
Inventor
Harold P. Norton
THE NATIONAL LITHOGRAPHING COMPANY,
WASHINGTON, D. C.

UNITED STATES PATENT OFFICE.

HAROLD P. NORTON, OF WASHINGTON, DISTRICT OF COLUMBIA.

DRAWING-PEN.

SPECIFICATION forming part of Letters Patent No. 509,137, dated November 21, 1893.

Application filed April 28, 1891. Serial No. 390,822. (No model.)

*To all whom it may concern:*

Be it known that I, HAROLD P. NORTON, a citizen of the United States, residing in Washington, District of Columbia, have invented certain new and useful Improvements in Drawing-Pens, of which the following is a specification.

My invention relates to drawing pens, either when used as sight line and ruling pens or when used in dividers or compasses.

The objects of my invention are to make a pen that may be quickly and easily changed from a fine line to a heavy line, or from a heavy line to a fine, which when once adjusted will make all the fine lines of uniform width, and all the heavy lines of uniform width; and to make a pen that can be adjusted to draw a line of any desired width and which will always draw a line of this same width regardless of how much it may be pressed against the straight edge or curve, and which may be opened for cleaning and quickly and easily readjusted to draw a line of the same width as before it was opened.

My invention is simple and can be applied at small cost to any drawing pen, and I attain these objects by the attachments illustrated in the accompanying drawings, in which—

Figure 1 is a side elevation of a self closing pen. Fig. 2, is a plan of a self closing pen. Fig. 3 is a vertical section to a larger scale of a self closing pen. Fig. 4, is a plan, to the same scale as Fig. 3, of a self closing pen. Fig. 5 is an elevation of an adjusting cam. Fig. 6, is a vertical section of an adjusting cam. Fig. 7 is a plan of an adjusting cam. Fig. 8 is a vertical elevation of a self opening pen. Fig. 9 is a plan of a self opening pen. Fig. 10, is a vertical section to a larger scale of a self opening pen. Fig. 11, is a side elevation of a cam used with the self opening pens. Fig. 12 is a side elevation of an adjusting stop. Fig. 13 is a plan to a larger scale of a self opening pen. Fig. 14 is a plan of a cam used with the self opening pen. Fig. 15 is a vertical section of an adjusting stop. Fig. 16 is a vertical section of an adjusting stop. Figs. 17, 18, 19, 20, 21, and 22 are vertical sections to larger scales showing different arrangements of the adjusting screws, cams, stops, and nuts.

Similar letters refer to similar parts throughout the several views.

The self closing drawing pen in its normal condition has its points closed and when used it is forced open by a screw until a line is made of the desired width.

In Figs. 1, 2, and 3 the improvement is shown applied to a self closing pen. J and J' are the pen points; K the handle; E the adjusting stop; this is hollow and has a thread on the inside and on the outside; F is a regulating screw to regulate the distance the pen is to open for the wide lines; A is a stud on the blade; it may be on either blade; C is the adjusting cam, working on the pivot B. The adjusting cam is shown in details in Figs. 5, 6, and 7; it has a milled circumference; its bottom is a plane, and its upper surface a helix or inclined plane.

The operation of the pen is as follows. The adjusting cam is turned until it is in such a position that its least height is under the stud or pin A, as shown in Figs. 1 and 3. The adjusting stop E is now screwed in until the pen is open to the width necessary for the fine lines. The regulating screw is now set so that it will allow the pen to open to the width necessary to draw the heavy line. Now as long as the pen is used as originally set it will always draw a fine line of constant width; when it is desired to draw a heavy line, the cam C is moved in either direction until the inclined surface or helix forces the points open to the distance allowed by the regulating screw F. It can now be used to draw any number of heavy lines, all of the same width. By turning the cam back to its original position the original fine line can be drawn, and these operations can be repeated as often as it may be desired.

Figs. 8 to 22, inclusive, show the improvement as applied to a self opening pen. Figs. 10 and 13 are a vertical section and plan of the improvement to a larger scale. J and J' are the pen points, K the pen handle, E the adjusting stop. This is hollow the same as in Figs. 1 to 4 and has a screw thread inside and outside as shown in Figs. 12, 15, and 16. F is a regulating screw to regulate the distance the pen is to open. A is a stud for the adjusting cam to bear against. C is the adjusting cam working on the regulating screw as a pivot.

The adjusting cam is shown in detail in Figs. 11 and 14. It has a milled circumference and a bearing surface on both sides, one to bear against the pen in certain positions, and the other to bear against the nut of the regulating screw in all positions; it also has a helix or inclined plane T Fig. 11 bearing against the stud A in all positions. Fig. 17 shows the same arrangement with the addition of a jam nut N, which is used to secure the regulating screw.

Fig. 18 shows another form of the improvement; all the parts are the same as in Figs. 10 and 13 except the adjusting stop, which is in this form made the same as a nut as shown at M and works on the regulating screw.

Fig. 19 shows another form of the adjusting cam C; the cam has the two bearing surfaces as already described, but the helix is cut on the inside or portion which bears on the regulating screw and becomes a thread for that screw.

Fig. 20 is the same as Fig. 19 the only difference being in the form of the regulating screw and adjusting stop. The diameter of the regulating screw is increased where it passes through the adjusting cam so that a coarser thread may be used as shown at R, and the adjusting stop is counterbored as shown at S Fig. 16.

Fig. 21 shows a form of the improvement in which the same form of adjusting stop is used as in Fig. 18, and the adjusting cam C and pin A are omitted.

Fig. 21 shows a form of the improvement which is the same as Fig. 19, except the adjusting cam which is omitted.

The operation of using the pen is as follows: The cam C in Figs. 8, 9, 10, 13, 17 and 18 is placed so that its lowest point or part of the helix or inclined plane bears on the pin A as shown in the figures. The regulating screw F is now moved so that the pen points will draw the fine line required; the adjusting stop E is now screwed up until it bears against the upper blade. As screwing the stop E into position will require a readjusting of the regulating screw it may be best to first adjust the adjusting stop E so that when the upper blade of the pen is forced against it a fine line of the desired width will be drawn. As soon as the stop E is adjusted to the proper position for the fine line the cam C is held in its position of least throw and the regulating screw moved until the pen points are open to the amount necessary to draw the heavy lines. Now by revolving the cam C in either direction its inclined plane or helix will bear on the pin A and force the pen points together until the upper blade brings up on the adjusting stop E. In this position of the cam any number of fine lines, all of the same width can be drawn and when desired by revolving the cam in the opposite direction a heavy line can be drawn, and the pen used to draw any number of heavy lines all of equal width.

In Fig. 18 the lock nut N is used to prevent any accidental movement of the adjusting cam or regulating screw.

In Fig. 18 the cam C is placed as in the other figures in its position of least throw and the regulating screw adjusted until a heavy line of the desired width is drawn. The cam is now revolved until a fine line of the desired width is drawn, when the adjusting nut or stop M is screwed up against the upper blade. The lock nut N is used to secure the regulating-screw in position. The operation of changing from heavy to fine or fine to heavy lines is the same as described for the previous figures.

The operation of the form of the improvement shown in Figs. 19 and 20 is as follows: The adjusting stop is first set so that the upper blade when forced against it will draw a fine line of the desired width. The adjusting cam is now screwed up against the nut on the regulating screw F and the regulating screw adjusted so that a heavy line of the desired width can be drawn. The lock nut N is now screwed up against the adjusting stop so as to secure the regulating screw in position. The lock nut may or may not be used according to the wish of the operator. To change from heavy to fine, or from fine to heavy lines, the cam C is screwed on the regulating screw F until it forces the upper point of the pen against the adjusting stop E or allows it to open to the desired width by screwing the cam C up against the nut on F.

In Fig. 21 the nut M is set so that the regulating screw can be screwed into such a position that the fine line will be drawn, and the nut N is set so that it may be unscrewed so as to draw a heavy line. The change from heavy to fine lines, or the reverse is made by screwing or unscrewing the regulating screw F, the nuts M and N stopping the screw when the required amount of motion has taken place.

In Fig. 22 the adjusting stop E is set so that the fine line is drawn by the pen when the upper blade is pressed against it and the nut N set so that the pen can be opened to the amount necessary to allow the heavy line to be drawn. The change from heavy to fine or fine to heavy lines is made by screwing and unscrewing the regulating screw F until it is stopped by the nut N or stop E.

When the stop E is once set or adjusted for any desired width of line, the pen may be opened for cleaning or any other purpose and when the upper blade is screwed back against the stop by the cam C or regulating screw F the line drawn will always be of the same width as the original one, and the stop C also prevents the blades or points of the pen from being forced together by accident when they are pressed too hard against the straight edge or curve.

Having now described my improvements, what I claim as my invention, and wish to secure by Letters Patent, is—

1. The combination in a drawing pen with self closing points of a revolving cam or helix, for changing the opening of the points, a pin or projection on one of the blades of the pen for the cam to bear against, and a regulating screw or stop to regulate the opening of the pen, substantially as set forth.

2. The combination in a drawing pen with self closing points, of an annular screw stop, having a screw thread inside and outside, a regulating screw, screwing into the inner thread of the annular screw stop, a revolving cam or helix for changing the opening of the points and a pin or projection on the blades for the cam or helix to bear against, substantially as set forth.

3. The combination in a drawing pen with self opening points of an annular screw stop having a screw thread inside and outside, a regulating screw, screwing into the inner thread of the annular screw stop and a lock nut for securing the regulating screw in position, substantially as set forth.

4. The combination in a drawing pen with self opening points of an adjusting screw, a regulating nut placed between the blades or points of the pen and a lock nut placed outside of the blades or points of the pen; the regulating nut and lock nut working on the screw thread of the adjusting screw, substantially as set forth.

5. The combination in a drawing pen with self opening points of a revolving cam or helix, revolving on the same center as the regulating screw, the helix or inclined surface of the cam bearing on or against a projection on one of the blades, substantially as set forth.

6. The combination in a drawing pen with self opening points, of a revolving cam or helix and a regulating screw. The said revolving cam or helix to have two parallel faces and a helix or screw thread at its center, the same as a portion of the thread on the regulating screw so that the helix or cam can revolve on the regulating screw, substantially as set forth.

7. The combination in a drawing pen with self opening points of an annular screw stop, having a screw thread inside and outside, a regulating screw screwing into the annular screw stop, a lock nut for securing the regulating screw in position, a revolving cam or helix pivoted on the same center as the regulating screw, the helix or inclined surface bearing on a pin or projection on one of the blades, substantially as set forth.

8. The combination in a drawing pen with self opening points of an annular screw stop having a screw thread inside and outside; a regulating screw, screwing into the annular screw stop; a lock nut for securing the regulating screw in position; a revolving cam or helix, revolving on the same center as the regulating screw. The said cam or helix to have two parallel faces and a helix or screw thread at its center the same as the regulating screw, substantially as set forth.

HAROLD P. NORTON.

Witnesses:
W. M. McFARLAND,
JAMES H. PERRY.